United States Patent
Keely et al.

(10) Patent No.: US 7,366,925 B2
(45) Date of Patent: Apr. 29, 2008

(54) PORTABLE POWER MANAGEMENT FOR A COMPUTING DEVICE CARRYING CASE

(75) Inventors: Leroy B. Keely, Portola Valley, CA (US); Seiya Ohta, Issaquah, WA (US); Michael George Lenahan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 383 days.

(21) Appl. No.: 11/148,940

(22) Filed: Jun. 9, 2005

(65) Prior Publication Data

US 2006/0279250 A1    Dec. 14, 2006

(51) Int. Cl.
*G06F 1/00* (2006.01)
*H05K 5/00* (2006.01)
*H05K 7/20* (2006.01)

(52) U.S. Cl. .................. 713/300; 361/683; 361/687

(58) Field of Classification Search ................ 713/300; 307/128; 361/683, 687; 62/3.7
See application file for complete search history.

(56) References Cited

U.S. PATENT DOCUMENTS

| | | | | |
|---|---|---|---|---|
| 5,666,265 A | * | 9/1997 | Lutz et al. | 361/683 |
| 5,992,155 A | * | 11/1999 | Kobayashi et al. | 62/3.7 |
| 6,169,384 B1 | * | 1/2001 | Shannon | 320/107 |
| 6,894,457 B2 | * | 5/2005 | Germagian et al. | 320/119 |
| 6,896,134 B2 | * | 5/2005 | Russell et al. | 206/320 |
| 7,224,086 B2 | * | 5/2007 | Germagian et al. | 307/128 |

OTHER PUBLICATIONS

"Charge, Organize and Protect Your Mobile Devices Wherever You Go!", *Compatibility List and User's Guide*, APC® TravelPower™ Case, 19 pages.

* cited by examiner

*Primary Examiner*—Suresh K Suryawanshi
(74) *Attorney, Agent, or Firm*—Woodcock Washburn LLP

(57) ABSTRACT

An apparatus, carrying case and computer system are disclosed herein. In the apparatus, a housing to which an electrical device may be electrically coupled is provided. A secondary battery may be electrically coupled to the housing and adapted to power the electrical device or to charge the device's internal battery.

18 Claims, 5 Drawing Sheets

PORTABLE POWER MANAGEMENT FOR A COMPUTING DEVICE CARRYING CASE

FIELD OF THE INVENTION

The present invention relates generally to portable computing devices. More particularly, the present invention relates to a computing device case having its own battery power supply.

BACKGROUND OF THE INVENTION

Portable computing devices, such as laptop computers, are powered by batteries when a power source is not readily available. When a laptop is operating on its internal battery power, the laptop battery's charge is steadily depleted. To continue using the device past the point at which the stored charge will be insufficient to power the laptop, a user must switch to powering the laptop with an external power source, such as by way of an AC adapter or 12V DC adapter. While doing so, the laptop's internal battery may also be charged. If an external power source is not available, however, the user's only option is to replace the internal battery with a charged spare, if the user happens to have one available. Replacing the battery with a charged spare requires the user to shut off or "hibernate" the device to swap out the battery to avoid losing data. As a result, the device's continuous running time while operating on battery power is limited to the run time provided by the internal battery. Likewise, a user cannot use the spare battery to power the laptop to preserve the charge of the laptop's internal battery unless the first user swaps the batteries.

One conventional solution to this problem is to design a laptop such that the laptop is capable of having a larger battery, or more than one battery. However, this conventional solution has the shortcoming that the overall weight, complexity and cost of the resulting laptop is typically increased because of such measures. In addition, the laptop's continuous run time, while longer with a larger size or number of internal batteries, is limited to the run time provided by such batteries because the user will still have to swap batteries when the charge is depleted. Another situation may arise is where a user may wish to simply to charge the laptop's internal battery while the user is traveling and not using the laptop. Without an external power source available, the user is not able do this.

When a user travels with a laptop computer, the laptop is typically transported in a carrying case. Conventionally, such a case does little more than serve as a storage area for the laptop any other user items. In other words, a conventional case did not typically interact with the laptop in any meaningful operational way. One attempt to provide additional functionality to such a case involved the addition of an AC adapter to the case. While this relieved a user from having to carry a separate AC adapter when traveling, the adapter by itself does not address the shortcomings addressed above. Namely, simply adding an AC adapter does not solve the problem of not being able to charge and/or prevent the discharge of the laptop's internal battery when an external power source is not available.

A laptop computer can be used while the display is closed (i.e., folded shut). For example, if a user wishes to simply use the laptop to listen to music, the laptop's display and keyboard may not need to be available to the user. Thus, it may be desirable to store the laptop in its carrying case while being used in such a manner, because doing so may be more convenient for the user and would conserve battery charge that would otherwise be required to power the laptop's display. Unfortunately, laptop computers generate heat while in operation, even if operating in a reduced functionality mode. A conventional laptop carrying case that provides any level of physical protection to the laptop does not provide adequate ventilation to enable sufficient cooling of the laptop. Using the laptop's own battery to power a cooling system would deplete the battery so quickly that such a solution is usually considered impractical. Thus, laptops cannot typically be used while sealed within a laptop bag or other type of carrying case because of the harm that would be caused by the high temperatures that would result.

Accordingly, there is a need for the ability to charge a computing device while away from an external power source, as well as to use such a computing device while the device is located within a carrying case or the like without overheating the device. Furthermore, there is a need for a carrying case that provides enhanced functionality to the user. The present invention satisfies these needs.

SUMMARY OF THE INVENTION

In view of the above shortcomings and drawbacks, an apparatus, carrying case and computer system are disclosed herein. In the apparatus, a housing to which an electrical device may be electrically coupled is provided. A secondary battery may be electrically coupled to the housing and adapted to power the electrical device or to charge the device's internal battery.

The carrying case, includes a protective housing to which a mounting device is coupled. The mounting device is for removably receiving and electrically coupling to a laptop computer having an internal battery. The case also includes a secondary battery that coupled to the housing and electrically coupled to the laptop computer. The secondary battery is adapted to power the laptop computer or to charge the internal battery. A cooling mechanism is also included in the carrying case, where the cooling mechanism is powered by the battery and coupled to the housing for cooling the laptop computer. In addition, the case includes an AC adaptor for receiving power from an external power source and charging the internal and secondary batteries and powering the electrical device.

The portable computing system, includes a mounting device to which a computing device may be electrically coupled and a secondary battery that is electrically coupled to the mounting device and adapted to power the electrical device and charge the internal battery. In addition, the system includes an AC adapter for receiving power from an external power source and charging the internal and secondary batteries.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Example Computing Environment

Figure 1:
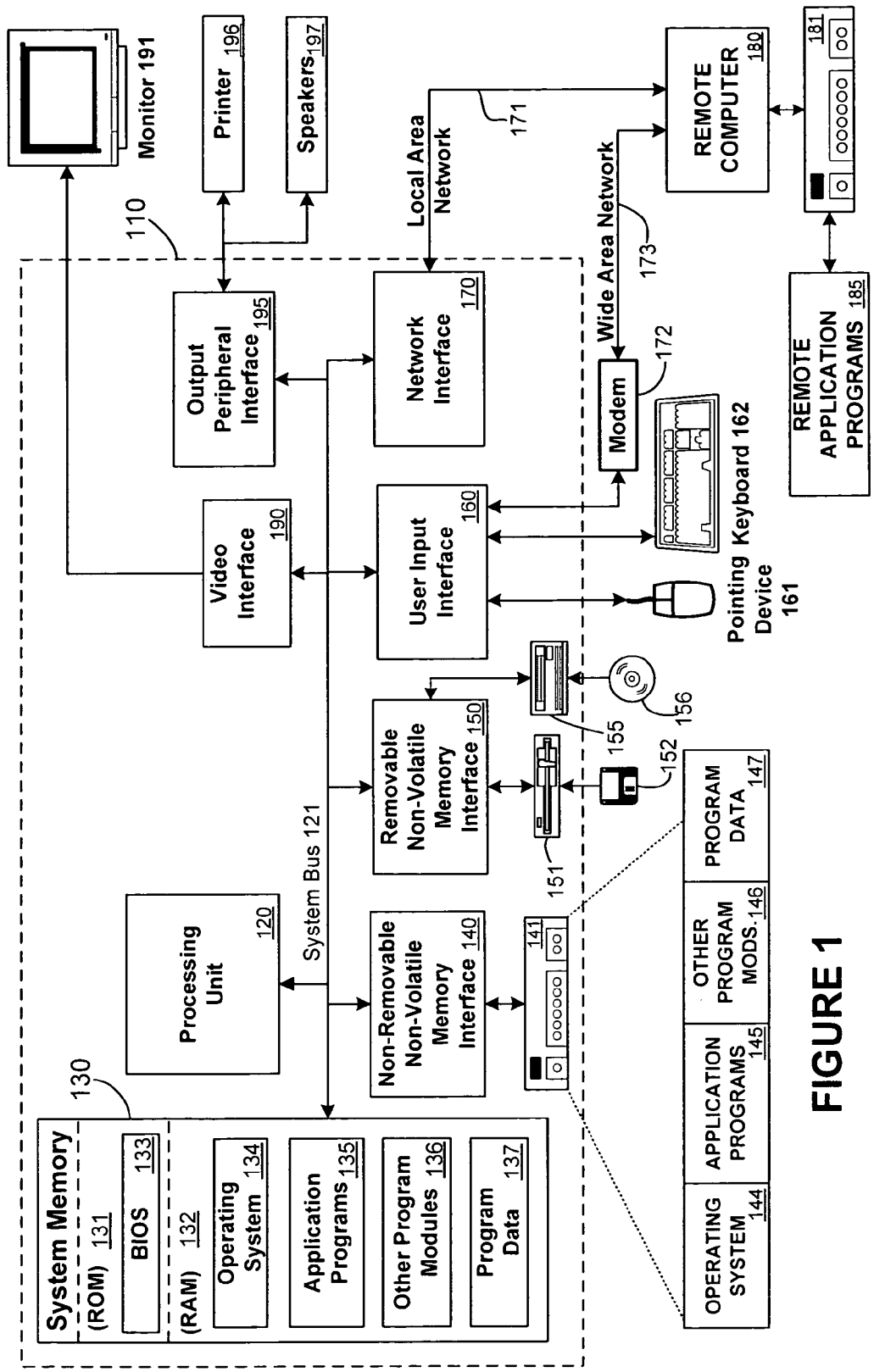
FIG. 1 is an example computing environment in which aspects of the present invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the example operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. Typically the functionality of the program modules may be combined or distributed as desired in various embodiments. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read-only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146 and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Example Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While example embodiments herein are described in connection with software residing on a computing device, one or more portions of the invention may also be implemented via an operating system, API, or middleware software between a coprocessor and requesting object, such that services may be performed by, supported in, or accessed via all of NET's languages and services, and in other distributed computing frameworks as well.

EXAMPLE EMBODIMENTS

In the discussion that follows, details relating to the implementation and interconnection of power adapters and batteries for portable electronic devices are assumed to be known to those skilled in the art. Accordingly, such details are omitted herein for purposes of clarity and explanation.

One embodiment of the present invention involves a carrying case that includes a secondary battery and is adapted to receive an electronic device such as a laptop computer or the like. When the case is operatively connected to an external power source, either the internal or secondary batteries, or both, may be charged. When the laptop is operated away from an external power source, the secondary battery may power the laptop or charge the laptop's internal battery, or both. Because the secondary battery may serve as the case's own power source, additional components and features may be implemented such as, for example, a cooling device to ensure that the laptop is kept within a safe operating temperature range while inside the case.

Figure 2:
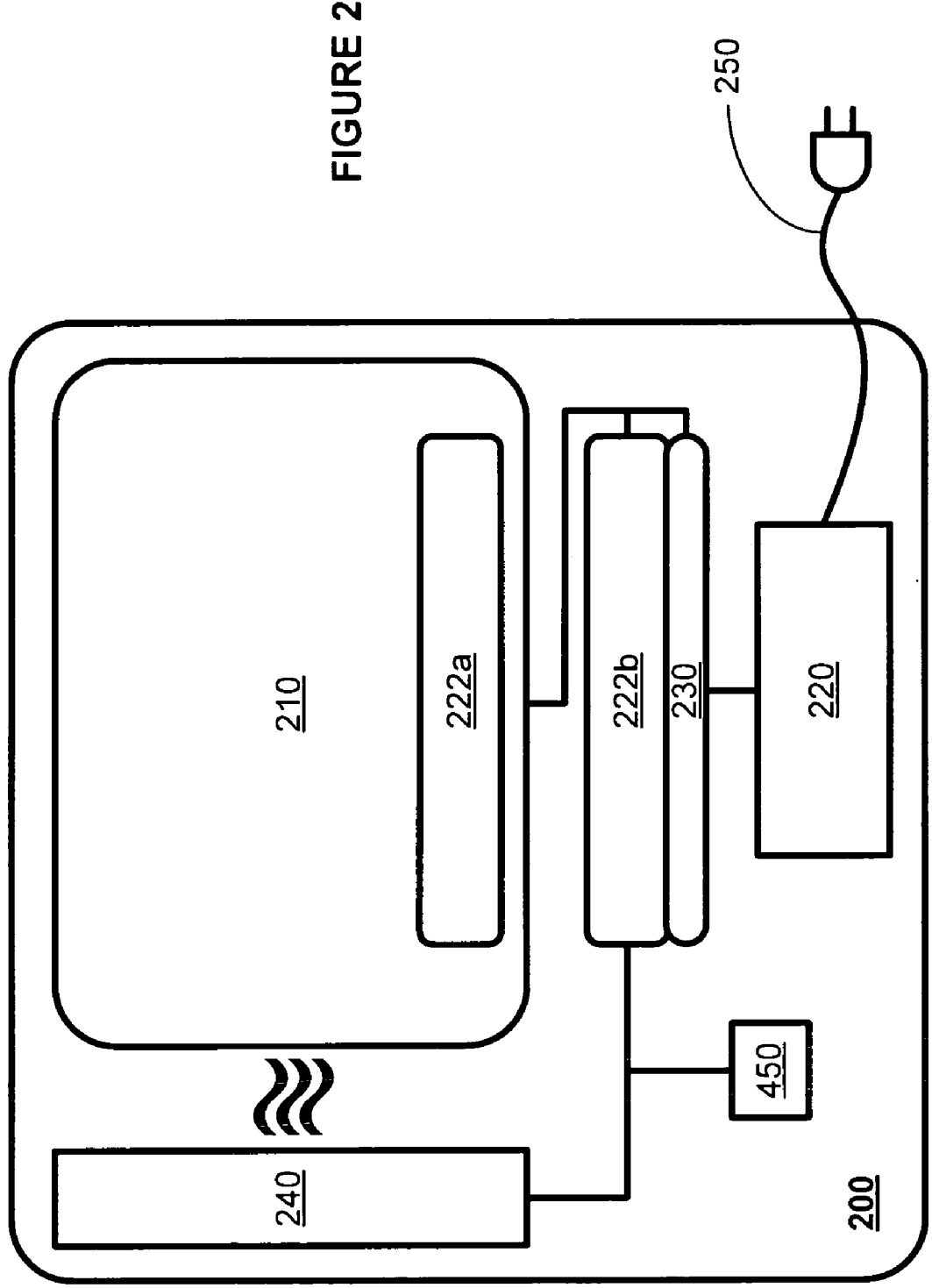
FIG. 2 is a diagram illustrating an example case in accordance with an embodiment of the present invention.

Referring now to FIG. 2, an example case 200 is illustrated in accordance with one embodiment of the present invention. It will be appreciated that the word "case" as used herein refers to any type of apparatus in which electronic device 210 may be stored and/or to which electronic device 210 may be operatively coupled. Thus, case 200 may be a carrying bag, briefcase, laptop bag, transportable docking station, or the like, and it should be understood that any type of a such apparatus may be used. As a result, references herein to device 210 being "within" case 200 are merely for convenience and clarity and do not indicate that an embodiment is limited to a case 200 that completely encloses device 210, or encloses device 210 in any particular way. Rather, it should be understood that case 200 may be adapted to couple to device 210 in any manner. For example, in an embodiment a user may operate device 210 while device 210 is "within" case 200. Case 200 may be constructed from any type of material and may have a protective housing that may be comprised of, for example, fabric, metal, plastic or the like.

Device 210 may be any type of transportable electronic device such as, for example, a laptop computer. As can be seen in FIG. 2, device 210 includes internal battery 222a. In an embodiment, case 200 may be adapted to receive external power by way of power input 250. Power input 250 may be any type of power cord, whether for AC power (e.g., 120 VAC) or for DC power (e.g., 12 VDC), and may also be retractable for convenience and storage. It will be appreciated that power input 250 may also receive an adapter (not shown in FIG. 2 for clarity) for coupling to a variety of power sources (e.g., airplane or automobile power sources, foreign country power outlets, etc.). AC adapter 220 may be coupled to power input 250 to convert a received AC power signal to a power signal that is appropriate for device 210 and batteries 222a-b. It will be appreciated that if the external power source is DC, rather than AC, then AC adapter 220 may be bypassed, or may have additional circuitry for processing such a DC input. In addition, optional charging adapter 230 may be coupled to AC adapter 220 in the event that further power signal processing is required before the signal is used as a power source for device 210 or for charging batteries 222a-b. Any type of electrical interconnections that are appropriate for the types of components included within case 200 and/or device 210 may be used.

Battery 222b may be coupled to case 200 in any number of ways. For example, in one embodiment battery 222b may be permanently affixed to case 200, while in another embodiment battery 222b may be removably coupled to case 222b. In addition, any number of configurations for charging batteries 222a-b with an external power source may be used in connection with an embodiment. For example, internal battery 222a may be charged directly from AC adapter 220 or charging adapter 230. Alternatively, battery 222b may charge internal battery 222a even when an external power source is present.

Although not illustrated in FIG. 2 for purposes of clarity, a docking mechanism may be provided for operatively coupling device 210 to case 200. In an embodiment, such an operative coupling may facilitate charging of internal battery 222a of device 210 and/or interaction of device 210 with one or more peripheral devices 450. In addition, case 200 may serve as a docking station such that a user may use device 210 while device 210 is still operatively connected to case 200. In such a manner, a user does not have to carry a second power input 250 and/or an external AC adapter 220, and can instead use the components that are part of case 200.

As was noted above, battery 222b may be charged by charging adapter 230, and may facilitate a variety of case 200 functionality by acting as a power source when an external power source is not present. For example, battery 222b may charge internal battery 222a when an external power source is not present. Battery 222b may also serve to form an uninterruptible power supply ("UPS") so that device 210 has a constant supply of power that is at least sufficient for a user of device 210 to save his or her work and power down device 210 in a controlled manner. In one embodiment, battery 222a may be the same type of battery as battery 222a to enable swapping of such batteries 222a-b if so desired, due to emergency, malfunction, user preference or the like.

In addition, battery 222b may power peripheral devices 450, which may be any type of device that may or may not be used in connection with device 210. For example, peripheral device 450 may be portable printer, monitor, projection device, or the like that is in operative communications with device 210, or may be a cellular telephone or personal digital assistant (PDA) that is merely connected to battery 222b (and/or charger adapter 230 and/or AC adapter 220) for purposes of being recharged. Such recharging may take place by way of any method for operatively connecting peripheral device 450 to the components of case 200 that will charge peripheral device 450. For example, a power cord adapter may be used to hard-wire peripheral device 450 to case 200, an induction charging pad (not shown in FIG. 2 for clarity) may be used to charge such peripheral device 450 without the need for wires, or the like.

As was discussed above, a user may wish to have device 210 in operation while placed inside case 200. As one non-limiting example, device 210 may be a laptop computer that the user wishes to play music while the user is on a plane. As the user will not typically need to access the keyboard or display of the laptop for such a purpose, it may be most convenient for the user to simply place the laptop in case 200. Because case 200, in an embodiment, has battery 222b as a power source when no external power source is present, a cooling unit 240 may be provided to keep device 210 within a normal operating temperature range. Cooling unit 240 may be any type of apparatus for reducing the temperature of components of device 210. For example, cooling unit 240 may include one or more of a fan, blower, heat sink, heat exchanger, circulating liquid, thermoelectric cooler and/or the like. Also, vents may be formed in case 200, and in an embodiment specialized fabric or other materials may be used to enable air circulation or the like. As a result, device 210 may be operated safely while within case 200.

It will be appreciated that appropriate control circuitry may need to be present in case 200 so as to effectuate such power features. For example, such control circuitry may include a thermostat for controlling cooling unit 240 to ensure a balance between temperature control and battery usage. In addition, power load levels and other such details may need to be accounted for in the event that numerous devices are to be charged by case 200. Furthermore, electrical interconnects may be present in case 200 to enable a user to connect, for example, a peripheral device 450 to device 210.

As was noted above, case 200 may be configured in any number of ways. In addition, case 200 may in fact be a component of another case. For example, case 200 may be an insert that may be removably placed within a larger case. Case 200 may also have structural reinforcements for protecting devices 210 and 450 from falls, spills, etc.

Figure 3:
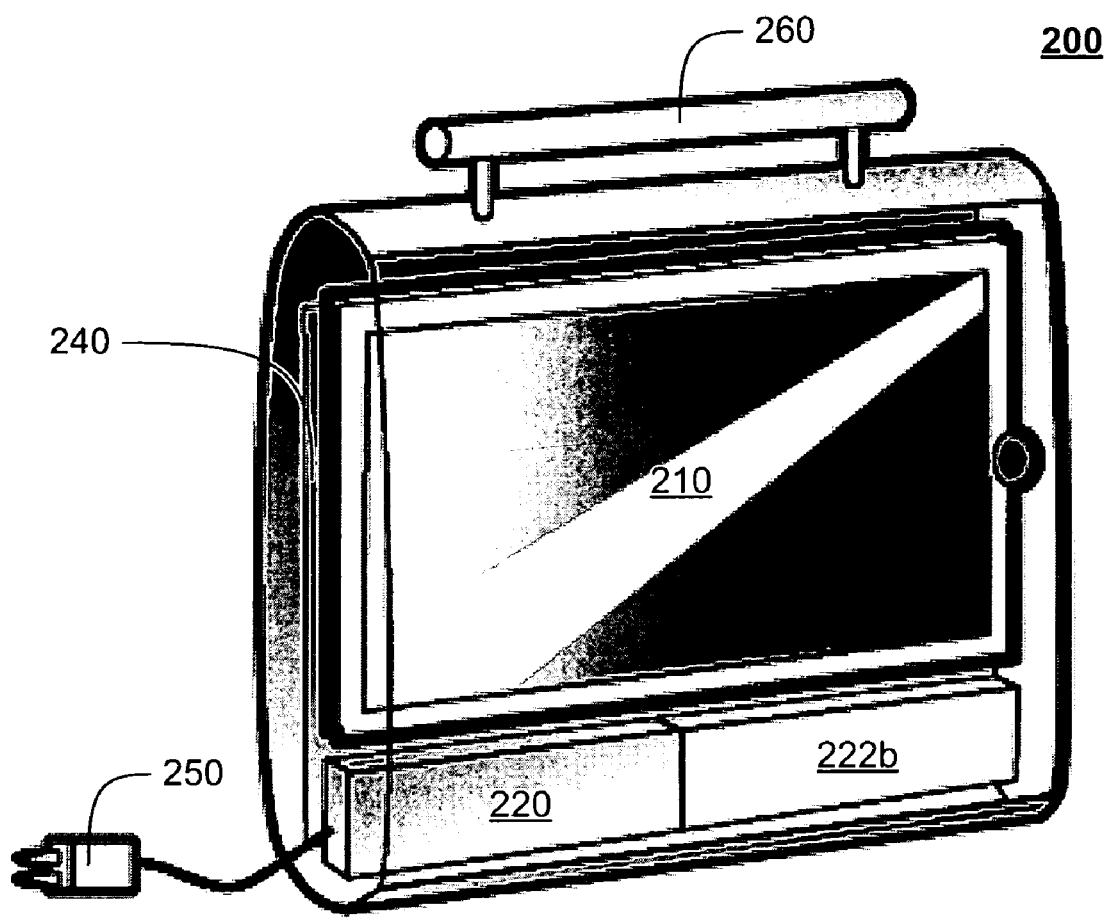
FIG. 3 is a diagram illustrating an example implementation of a case in accordance with an embodiment of the present invention.
Figure 4A:
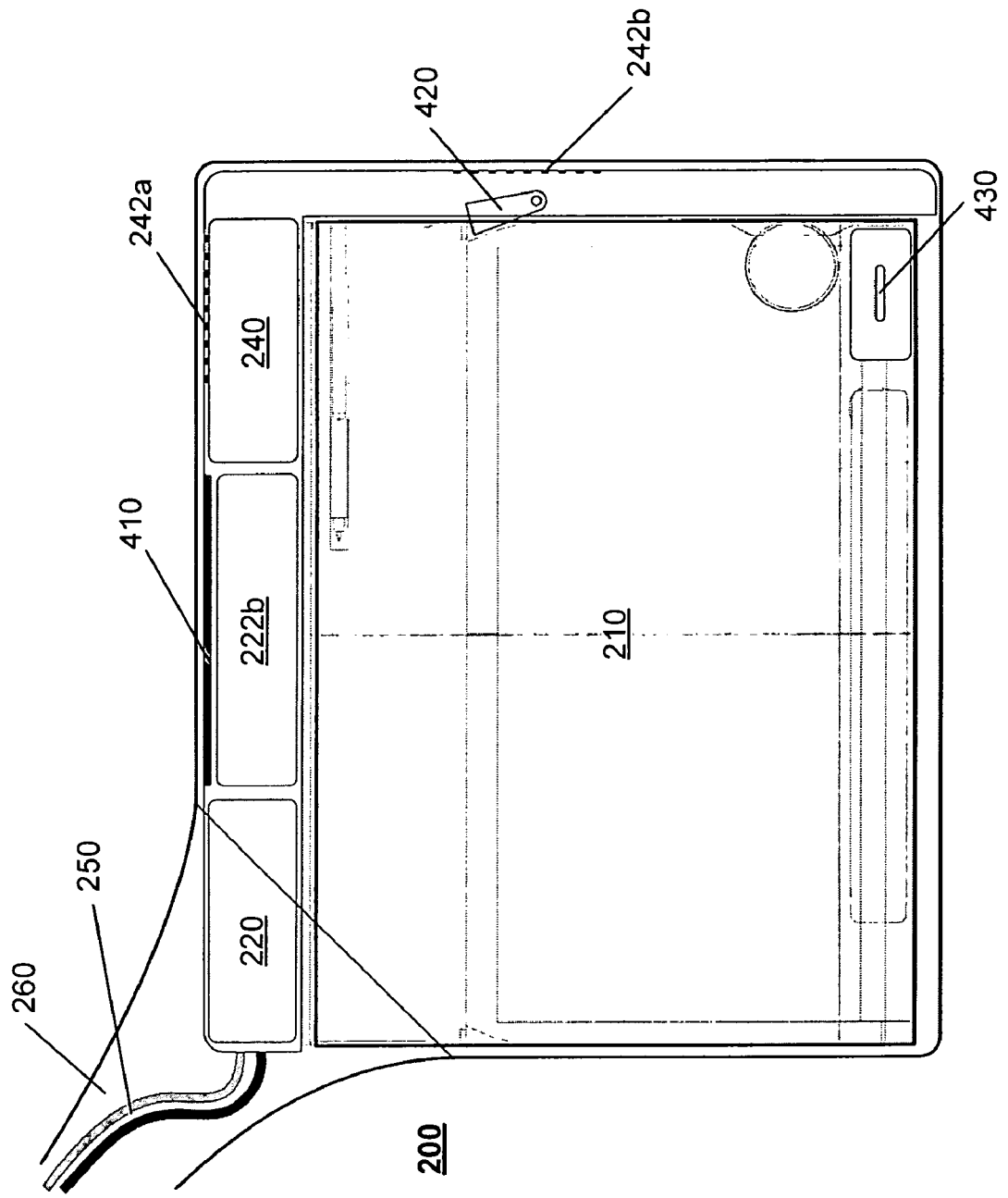
FIG. 4A is a diagram illustrating another example implementation of a case in accordance with an embodiment of the present invention.
Figure 4B:
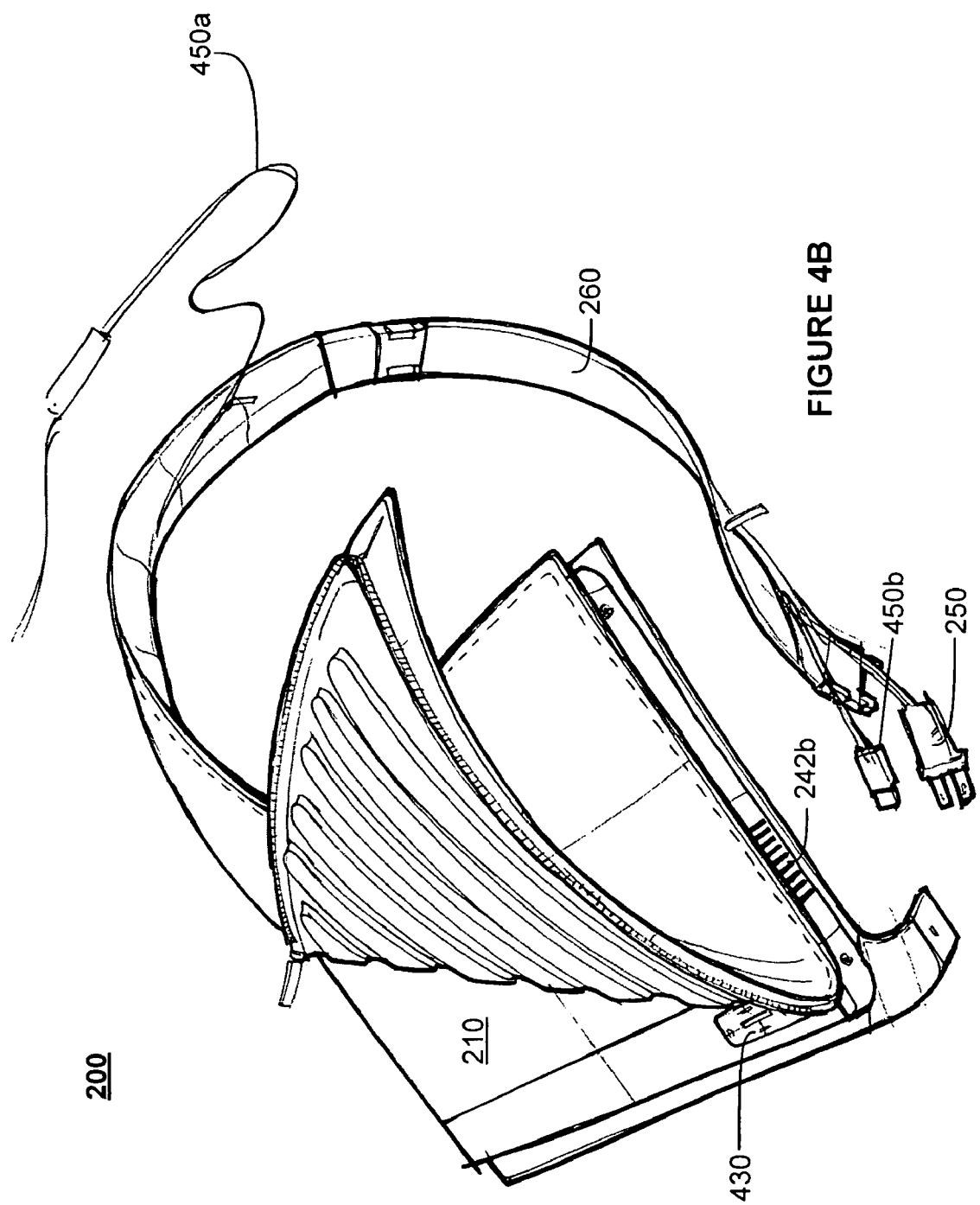
FIG. 4B is an illustration of the example case of FIG. 4A.

Now that an example case 200 has been discussed in connection with one embodiment of the present invention, FIGS. 3-4B illustrate two example configurations having a variety of features according to various embodiments. It will be appreciated that the examples of FIGS. 3-4B are in no way intended to be comprehensive, as any number of different configurations are equally consistent with an embodiment. Thus, and turning now to FIG. 3, a drawing of an example case 200 in accordance with an embodiment is presented. Case 200 has a handle 260 and includes AC adapter 220, cooling unit 240, power input 250 and battery 222b, as was discussed above in connection with FIG. 2. Device 210 can be seen within case 200. As can be seen in FIG. 3, case is configured as a user briefcase, which is only one of any number of case 200 configurations.

For example, FIG. 4A is a diagram illustrating another example case 200 in accordance with an embodiment. While AC adapter 220, battery 222b, cooling unit 240 and power input 250 are as was discussed above in connection with FIG. 2, it can be seen that case 200 of FIG. 4A has additional features. For example, case 200 includes cooling induction vents 242a-b for permitting air circulation that may work in connection with or in addition to cooling unit 240 to cool device 210 and any other devices, such as peripheral devices (not shown in FIG. 4A for clarity), AC adapter or the like.

Case 200 also includes locking mechanism 420 for securely coupling device 200 to case 210. Locking mechanism 420 may, in an embodiment, be a part of a docking mechanism (not shown in FIG. 4A for clarity) for operatively coupling device 210 to case 200. Case 200 further includes biometric security reader 430, which may, for example, be used to ensure that only authorized users may used device 210 and/or case 200. In addition, case 200 includes auxiliary display 410. Such display 410 may be used, for example, by a user who wishes to use limited functionality of device 210. For example, the user may wish to play music on a laptop computer, which does not typically require the use of an entire laptop display. Auxiliary display 410 may also have input/output capabilities to enable a user to issue commands to device 210 without the need for full access to device 210.

It can also be seen in FIG. 4A that handle 260 may be implemented as a carrying strap. Furthermore, power input 250 may be located proximate handle/strap 260 such that space within case 200 is saved and power input 250 is easily accessible to the user when the user has access to an external power source. FIG. 4A therefore serves to illustrate the flexibility in possible case 200 configurations that are available according to an embodiment.

FIG. 4B is an illustration of the example case 200 of FIG. 4A. As can be seen in FIG. 4B, case 200 includes device 220, cooling unit 240, power input 250, handle 260 (formed as a carrying strap in FIG. 4B), cooling induction vent 242b and biometric security reader 430 as was described above in connection with FIGS. 2 and 4A. Furthermore, peripherals 450a-b are present in FIG. 4B. Peripheral 450a represents a headphone cord that is collocated in handle/strap 260, along with power input 250. In addition, and also collocated in handle/strap 260 along with power input 250 is peripheral 450b, which is illustrated as a USB port. One should appreciate that any type of peripheral device 450 or connection/connector may be used in connection with an embodiment. Also, such a peripheral 450 need not be located within handle 260, as any configuration of such peripheral 450, or the lack of such peripheral 450, is equally consistent with an embodiment.

While the present invention has been described in connection with the embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. An apparatus, comprising:
   a transportable housing to which an electrical device may be electrically coupled;
   a cooling mechanism for cooling the electronic device;
   a thermostat for controlling the cooling mechanism; and
   a secondary battery electrically coupled to the housing and adapted to power the electrical device or to charge the internal battery.

2. The apparatus of claim 1, wherein the secondary battery powers the electrical device or charges the internal battery when an external power source is not present.

3. The apparatus of claim 1, further comprising an AC adapter for receiving power from an external power source and charging the internal and secondary batteries.

4. The apparatus of claim 3, further comprising a charging adapter for processing an output of the AC adapter prior to input to the internal and secondary batteries.

5. The apparatus of claim 3, wherein the AC adapter further powers the electrical device.

6. The apparatus of claim 3, wherein the power from the external power source is received from a power cord.

7. The apparatus of claim 6, wherein the power cord is retractable into the apparatus.

8. The apparatus of claim 6, wherein the apparatus further comprises a handle, and wherein the power cord is collocated with the handle.

9. The apparatus of claim 1, wherein a peripheral device is operatively connected to the housing and the electronic device.

10. The apparatus of claim 1, wherein the cooling mechanism is one of a fan, blower, heat sink, heat exchanger, circulating liquid or thermoelectric cooler.

11. The apparatus of claim 1, wherein the cooling mechanism is powered by the secondary battery.

12. The apparatus of claim 1, wherein the housing is removably coupled to the apparatus.

13. The apparatus of claim 1, wherein the internal and secondary batteries each have an associated battery type, and wherein the internal and secondary batteries are the same type of battery.

14. The apparatus of claim 1, wherein the electronic device is a laptop computer.

15. A laptop computer carrying case, comprising:
   a protective housing;
   a mounting device coupled to the housing for removably receiving and electrically coupling to a laptop computer having an internal battery;
   a secondary battery coupled to the housing and electrically coupled to the laptop computer, wherein the secondary battery is adapted to power the laptop computer or to charge the internal battery;
   a cooling mechanism powered by the battery and coupled to the housing for cooling the laptop computer;
   a thermostat for controlling the cooling mechanism; and
   an AC adaptor for receiving power from an external power source and charging the internal and secondary batteries and powering the electrical device.

16. The carrying case of claim 15, further comprising:
   a power cord for receiving power from the external power source; and
   a handle for carrying the case, wherein the power cord is collocated with the handle.

17. A portable computing apparatus, comprising:
   a mounting device to which a computing device may be electrically coupled;
   a secondary battery electrically coupled to the mounting device and adapted to power an electrical device and charge an internal battery;
   a cooling mechanism powered by the secondary battery for cooling the electronic device;
   a thermostat for controlling the cooling mechanism; and
   an AC adapter for receiving power from an external power source and charging the internal and secondary batteries.

18. The apparatus of claim 17, wherein the computing device is a laptop computer.

* * * * *